(12) United States Patent
Landis et al.

(10) Patent No.: US 7,559,758 B2
(45) Date of Patent: Jul. 14, 2009

(54) MOULD FOR NANO-PRINTING, PROCESS FOR MANUFACTURING SUCH A MOULD AND USE OF SUCH A MOULD

(75) Inventors: Stefan Landis, Voiron (FR); Laurent Mollard, Grenoble (FR); Cecile Gourgon, Cessieu (FR); Jean-Herve Tortai, Meylan (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 684 days.

(21) Appl. No.: 11/111,886

(22) Filed: Apr. 22, 2005

(65) Prior Publication Data
US 2005/0253296 A1  Nov. 17, 2005

(30) Foreign Application Priority Data
Apr. 28, 2004 (FR) ................... 04 50809

(51) Int. Cl.
  *B29C 59/00* (2006.01)
(52) U.S. Cl. .................. 425/385; 425/215; 264/293

(58) Field of Classification Search ................. 425/385, 425/215; 264/293
See application file for complete search history.

(56) References Cited

U.S. PATENT DOCUMENTS
2006/0192320 A1* 8/2006 Tokita et al. ................ 264/293

FOREIGN PATENT DOCUMENTS
FR      2 849 221       6/2004
WO   WO 2004/059386    7/2004

OTHER PUBLICATIONS

L.J. Heyderman et al., Flow behavior of thin polymer films used for hot embossing lithography, Jul. 16, 2000, pp. 229-245.
S.C. Lin et al., Simultaneous immobilization of protein microarrays by a micro stamper with back-filing reservoir, 2004, pp. 174-185.

* cited by examiner

*Primary Examiner*—Maria Veronica D Ewald
(74) *Attorney, Agent, or Firm*—Oblon, Spivak, McClelland, Maier & Neustadt, P.C.

(57) ABSTRACT

The invention relates to a mould for nano-printing, comprising recess and projection type patterns (12). It also comprises one or several ducts (13), each providing a communication between a mould pattern and a reservoir area (14).

32 Claims, 11 Drawing Sheets

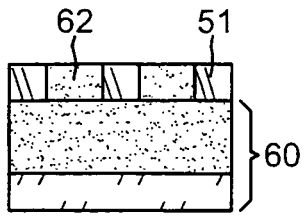
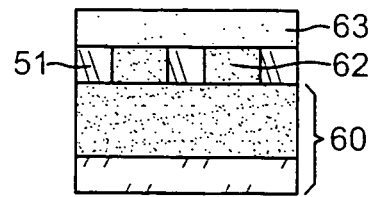
FIG. 12E  FIG. 12F
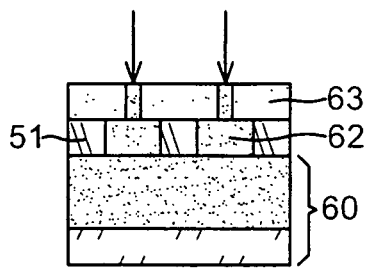
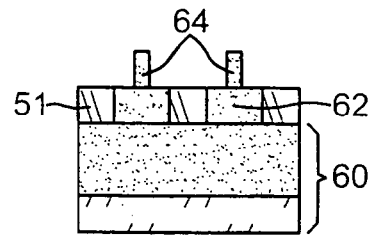
FIG. 12G  FIG. 12H
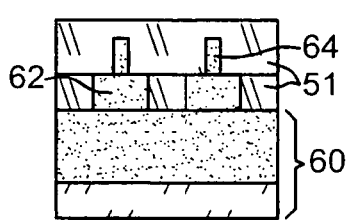
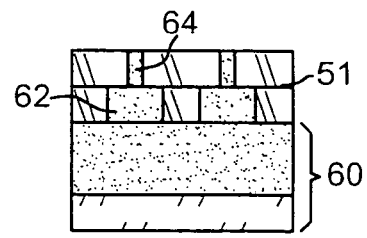
FIG. 12I  FIG. 12J
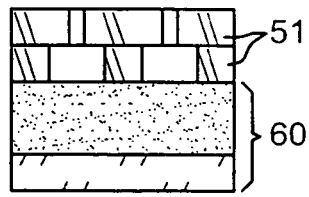
FIG. 12K

MOULD FOR NANO-PRINTING, PROCESS FOR MANUFACTURING SUCH A MOULD AND USE OF SUCH A MOULD

TECHNICAL DOMAIN

Technological progress in the fields of microelectronics, optical, magnetic or mechanical micro-systems and more generally of the miniaturisation industry, will involve a gradual change to manufacturing techniques for micro- and nano-objects. In this race towards miniaturisation, lithography plays an extremely important role because this is a step that will define the resolution limits of an industrial process.

At the moment, deep ultraviolet optical lithography (Deep UV) with a wavelength of about 248 nanometres, is the lithography technique used in industrial production. This technique combines a sufficiently high resolution (of the order of 130 nm) for existing devices and an efficiency satisfying economic needs. Despite everything, at the moment some lithography tools are capable of producing patterns with a resolution of up to a few tens of nanometres. Such resolutions may be achieved particularly by means of electron beam lithography, but the major disadvantage with this system is that the writing time is too long for industrial applications.

Nano-printing or direct printing of structures at a nanometric scale is an innovative method of duplicating patterns, capable of achieving resolutions comparable with what can be obtained by electron beam lithography, but with much shorter process times.

STATE OF PRIOR ART

The principle of nano-printing, as for example described in patent U.S. Pat. No. 5,772,905 and shown in FIGS. 1A to 1D, consists of physically deforming a layer of material 1 to be moulded, usually a polymer and/or resin placed on a substrate 2, by a mould 3 marked with patterns 30 with one or several recesses 30a and one or several projections 30b. The mould 3 is applied and pressed at a pressure P using a press (not shown), onto the layer of material 1 to be moulded (FIG. 1A). The layer of material 1 to be moulded is heated to a temperature exceeding its vitreous transition temperature. The mould 3 is made using one of the conventional lithography techniques such as deep UV lithography or electron beam lithography.

The patterns of mould 3 are then printed as negatives in the layer of material 1 to be moulded after the mould 3 has been removed (FIG. 1B). Therefore, the result is patterns with one or several projections and one or several recesses. In other words, the impression of the mould is made in the material 1 to be moulded. This impression contributes to forming a mask for which the patterns can then be transferred by etching in the substrate 2. The recessed and projecting patterns of the mould 3 are generally all approximately the same depth since a mask is to be made. Steps are taken such that the residual material to be moulded 4 remains between the substrate 2 and the mould 3 at the end of pressing, such that the mould 3 does not come into contact with the substrate 2. There would then be a risk that it could be damaged.

The residual material to be moulded 4 is then eliminated by oxygen plasma type etching to expose the substrate 2 (FIG. 1C). The layer of material 1 to be moulded thus delimited forms the mask 6 with one or several through openings 5.

A plasma etching step can be used to etch the substrate 2 at through openings 5 so as to transfer patterns from the mask 6 into the substrate 2 (FIG. 1D).

The resolution of the nano-printing technique is the same as the resolution of the mould. Therefore it depends mainly on the lithography technique used to make the mould. The advantage of nano-printing over techniques with resolution as good as electron beam lithography, is the relatively high speed reproduction of patterns. For comparison, printing of 200 nanometre diameter pads at a spacing of 200 nanometres over an area of 1 cm$^2$ requires 3 hours by electron beam lithography but only a few minutes by nano-printing.

The nano-printing technique is particularly promising for nano technology applications. But in particular, it must be capable of obtaining very small dimensions over large surface areas, for example on substrates with diameters of several hundred millimetres.

However, this nano-printing technique introduces at least two types of problems.

The first relates to a risk of fluid confinement between the material to be moulded and the bottom of the mould.

When pressing at atmospheric pressure, air can be confined at the bottom of the mould and a digitation phenomenon occurs with the consequence that flow passages 7 are printed in the material to be moulded in addition to the required patterns. It is then impossible to accurately reproduce the negative of patterns in the mould in the material to be moulded. These passages 7.1, called Saffman-Taylor fingers, are shown in FIG. 2. The patterns that are the negative of the patterns in the mould are marked with reference 7.2.

This phenomenon was discovered during extraction of oil that generally saturates porous rocks. An attempt was made to drive the oil out of these rocks by pushing it with water (or a gas). Oil drillers have observed the formation of water "fingers" in the oil during such a process, thus limiting the oil recuperation rate.

Saffman and Taylor have observed that when a less viscous fluid pushes a more viscous fluid in a linear and thin channel, the interface between the two fluids becomes unstable and a pattern is formed that is now called the Saffman-Taylor finger or Saffman-Taylor instability.

These instabilities cause genuine problems because they locally destroy the structures under pressure, sometimes over large areas.

One solution would be to work under a vacuum, but existing nano-printing equipment is incapable of working under a vacuum or pumping sufficient air present between the mould and the material to be moulded.

The inventors have also observed that this Saffman-Taylor instability problem is not only related to the presence of air, but it can also be due to degassing products originating from the material to be moulded that then appear when the temperature rises.

Another annoying problem is that when making the impression of the mould 3 in the layer of material 1 to be moulded, non-homogeneities of the thickness hr of the residual material to be moulded 4 occur as a function of the position of the projecting parts 30b of the mould 3 with respect to substrate 2 and/or their density.

An attempt is made to assure that the thickness hr of the residual material to be moulded 4 necessary to prevent any contact between the mould 3 and the substrate 2 is as uniform as possible over the entire surface of the substrate 2. Refer to FIG. 1B.

It should be noted that the initial thickness of the material layer 1 to be moulded may be between a few nanometres and a few hundreds of microns and the thickness hr of the residual material to be moulded 4 may be between a few nanometres and the value of the initial thickness of the material layer to be moulded.

A non-homogeneity of the thickness hr of the residual material to be moulded 4 will have several consequences that will be explained with reference to FIGS. 3A to 3C. FIG. 3A shows the impression of the mould made in the initial layer of material to be moulded. The thickness hr1 obtained for the left recess is smaller than the thickness hr2 obtained for the right recesses. During the etching step intended to make through openings 5 in the mask 6 and described in FIG. 1B, and therefore to expose the substrate 2 at the recesses in the impression of the mould 3 made in the layer of material 1 to be moulded, the substrate 2 is reached faster in places where the thickness is the least (hr1), as shown at the left recess in FIG. 3B. However, etching will continue until the substrate 2 has been reached for all other recesses (FIG. 3C). During this additional etching time, the through opening 5 at the left, obtained first, will be widened due to the lateral etching inherent to plasma etching processes. Its width L1 becomes much larger than the widths L2 of other through openings 5 obtained later.

Therefore a non-homogeneity in the residual thickness causes a loss of dimensional control of the patterns of the mask 6, after plasma etching with respect to the patterns 30 in the mould 3. This loss of dimensional control will be seen in the substrate 2 while it is being etched.

This is unthinkable for making nano-structures that require the most perfect possible dimensional control.

This non-homogeneity in the residual thickness that occurs during pressing can have different causes. Firstly, it may originate from poor distribution of the force applied by the press piston. Parallelism between the mould 3 and the substrate 2 is not necessarily well controlled and may locally influence the thickness of the residual material 4 to be moulded. During pressing, the mould 3 may also be subjected to local deformations that cause this variation in the thickness of the residual material 4 to be moulded.

The forward movement of two remote parts 3a, 3b of a mould 3 in a layer of material 1 to be moulded can be compared in FIGS. 4A to 4D. Each of these two parts is subjected to a force P with the same intensity. The part 3a has patterns, for which the density is much higher than the density of the patterns in the part 3b. In this example, and for an equal surface area, part 3a comprises three projections, while part 3b only has one. In moving from FIG. 4A to 4C, it can be seen that part 3a is slowed more by evacuation of the material 1 to be moulded than part 3b, its patterns are denser. This results in a deformation of the mould 3 that causes a difference in levels of the two parts 3a, 3b of the mould 3. This slowing during pressing will also cause a variation in the thickness of the residual material to be moulded when the same pressing force P is applied. If the same thickness of residual material to be moulded is to be obtained in the end, a force needs to be applied on the mould 3a for a longer time as shown in FIG. 4D.

Similarly, the thickness of the residual material to be moulded varies for different size patterns, due to the difference in the quantity of material to be moulded to be moved around the projections 30b of the mould.

If the same mould includes patterns comprising areas with different densities or projections and/or recesses with difference sections, it can easily be understood by reading the above explanations that the thickness of residual material to be moulded will not be homogeneous under the mould impression after pressing.

PRESENTATION OF THE INVENTION

The purpose of this invention is to propose a mould for nano-printing that will not cause the problems mentioned above when it is being used.

One purpose in particular is to propose a mould for nano-printing to prevent fluid confinement problems. Another purpose is to propose a mould for nano-printing that provides a means of obtaining an approximately constant thickness of residual material to be moulded after pressing, regardless of the type of mould patterns and the density of these patterns.

To achieve this, this invention is intended to provide at least one duct through which fluid causing the Saffman-Taylor instability can escape, with part of the material to be moulded. Thus, allowing the fluid to escape means that the patterns obtained by moulding are free from Saffman-Taylor fingers. Allowing part of the material to be moulded to escape enables approximately homogenous penetration of the mould in the material to be moulded regardless of the mould patterns, such that the thickness of the residual material to be moulded is as constant as possible.

To achieve these purposes, the invention more particularly relates to a mould for nano-printing provided with recessed and projecting patterns and one or several ducts, each providing a communication between a mould pattern and a reservoir.

Preferably, a duct opens up in a recess.

The reservoir area may contain a single reservoir or several reservoirs.

When there are several reservoirs, they may be independent or they may communicate with each other.

A duct may have an approximately constant cross-section, or on the contrary it may have a variable cross-section.

A duct may be tapered, so that the position of the rupture area of the material to be moulded during removal from the mould can be determined.

The reservoir area may communicate with the outside of the mould to facilitate emptying of the reservoir area after the mould has been used.

This communication may be made using one duct that opens up at the periphery of the mould.

This invention also relates to a process for making a mould for nano-printing with recessed and projecting patterns. It comprises several steps using lithography techniques, these steps including a step to make mould patterns, a step to make a reservoir area, a step to make at least one duct providing a communication between the reservoir area and a pattern in the mould, these three steps using cores.

The step to make the reservoir area may be done:
  using lithography to make a first core corresponding to the inside of the reservoir area;
  encapsulating the first core in a material that is the same as the mould material;
  levelling the material from which the mould is made, stopping on the first core so as to obtain a first surface;
  eliminating the first core to expose the inside of the reservoir area.

The step to make at least one duct may be done:
  using lithography to make a second core corresponding to the inside of the duct;
  encapsulating the second core in a material that is the same as the mould material;

levelling the mould material stopping on the second core so as to obtain a second surface;

eliminating the second core to expose the inside of the duct.

The pattern production step may be done:

using lithography to make at least one third core corresponding to a recess in the patterns;

encapsulating the third core in a material that is the same as the mould material;

levelling the mould material stopping on the third core so as to obtain a third surface;

eliminating the third core to expose the recess.

The first core may be made on a substrate acting as the bottom of the mould.

The second core may be made on the first surface.

The third core may be made on the second surface.

The elimination step may be common for the first, second and third cores.

In one variant, the third core may be made on a second substrate.

The second substrate may be a dual layer.

Thus, the second core may be made on the third surface.

The elimination step is then common for the second and third cores.

The second surface can be assembled to the first surface after the elimination step.

The second substrate can be removed after assembly.

The first core, the second core and the third core may be made of a material that may have been etched through a mask obtained by lithography.

As a variant, the cores may be made based on a sensitive exposed and developed material.

The process may include a severe hard bake step between development and encapsulation, in order to transform the sensitive material.

The sensitive material may be a photosensitive resin or an electron sensitive resin.

The sensitive material may be a material in the hydrogen silsesquioxanes family.

As a variant, the sensitive material may be a mineral resin such as aluminium fluoride.

This invention also relates to a process for moulding a deformable material with such a mould.

BRIEF DESCRIPTION OF THE DRAWINGS

This invention will be better understood after reading the description of example embodiments given purely for guidance and in no way limitatively, with reference to the attached drawings among which:

FIGS. 12A to 12K show another embodiment of one or several ducts and patterns in a mould according to the invention;

Identical, similar or equivalent parts in the different figures described below are marked with the same numeric references so as to facilitate the passage from one figure to the next.

The different parts shown in the figures are not necessarily all at the same scale, to make the figures more easily understandable.

DETAILED PRESENTATION OF PARTICULAR EMBODIMENTS

Figure 5A:
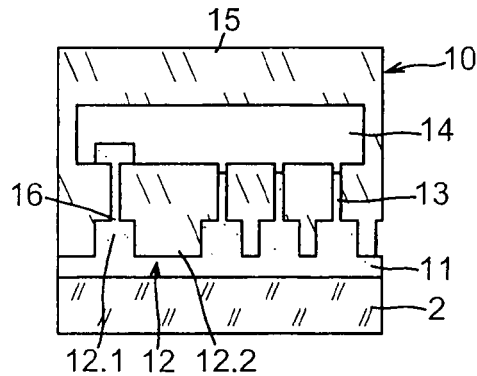
FIGS. 5A to 5D show various views of a mould conforming with the invention.

We will now refer to FIG. 5A that shows a mould 10 according to the invention during a pressing operation of a material 11 to be moulded. This material 11 may be any material with a solid and viscous or liquid phase in the temperature range used (from ambient temperature to a temperature of a few hundred degrees centigrade). For example, either polymers with vitreous transition temperatures and therefore a solid and viscoelastic phase, or metals with low melting temperatures such as tin (Sn) or indium (In), may be used. For example, this material was deposited on a substrate 2 with a whirler.

The mould 10 conventionally comprises patterns 12 in recesses 12.1 and projections 12.2 and a bottom 15. At least one duct 13 provides a communication between a pattern 12 of the mould 11 and a reservoir area 14 for the material 11 to be moulded. In the example, the reservoir area comprises a single fully covered reservoir 14, but this is not compulsory. Instead of the patterns 12 being at the bottom of the mould as they are conventionally, the reservoir area 14 is now inserted between the patterns 12 and the bottom 15 of the mould 10. The mould bottom covers the reservoir area 14. This could be referred to as a double bottom.

In the example shown, there is a duct 13 that opens up at each recess 12.1. The number of ducts is not necessarily equal to the number of recesses. It would be possible that there are less ducts than recesses, or even more. Similarly, one duct could open up at a projection or on a side of a recessed area.

Figure 6A:
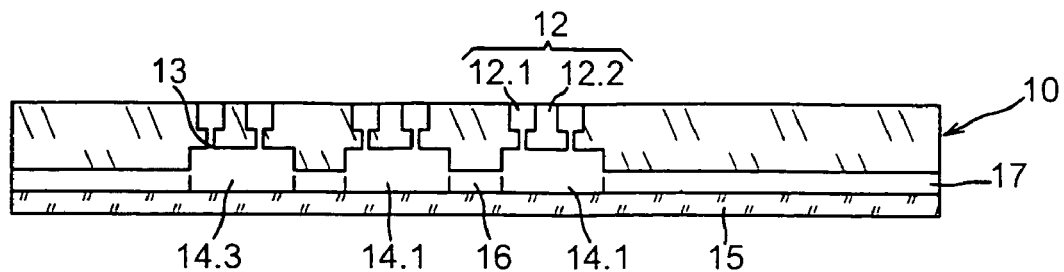
FIGS. 6A and 6B show several views of a mould according to the invention for which the reservoir area comprises several reservoirs.
Figure 6B:
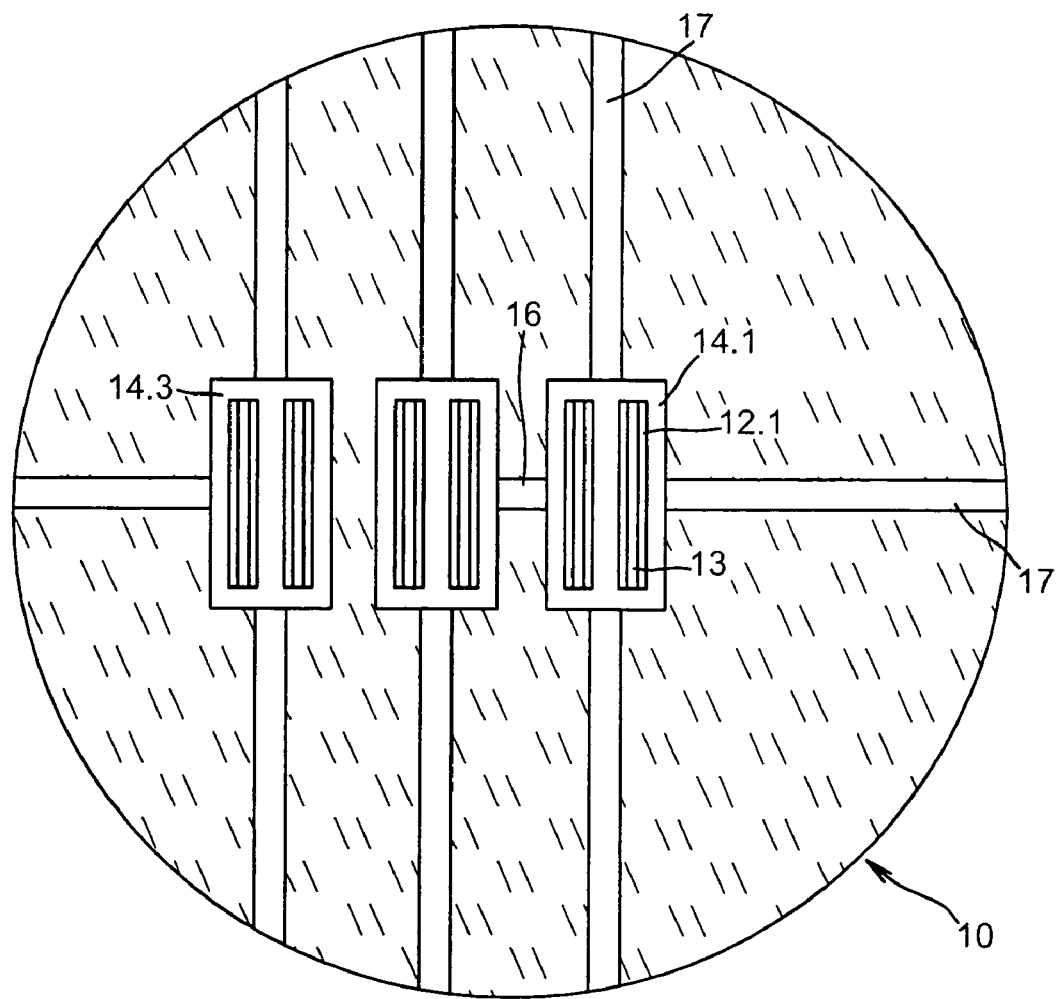

In the example shown, several ducts 13 open up in the single reservoir 14. It would be possible for the reservoir area 14 to have several distinct reservoirs as shown in FIG. 6B, and that these reservoirs could be independent from each other or they could communicate with each other.

The use of at least one duct 13 and the reservoir area 14 provides a means of compensating for confinement of air (or degassing product) problems that existed before between the material to be moulded and the patterns. This air can escape through the ducts to the reservoir area.

Problems of non-homogenous thickness in the residual material to be moulded are also solved because the excess material 11 to be moulded that would previously have formed an overthickness escapes through a duct 13 and accumulates in the reservoir area 14.

It can be seen in FIG. 5A, that the density of patterns 12 is low over the left part of the mould 10, that there is an isolated recess 12.1, that the density of patterns is greater on the right part, and that there is a group of three recesses 12.1. Ducts 13 open up in each of these recesses 12.1.

The ducts 13 are nanometric in size. They could have a simple shape, for example they could have an approximately constant circular or rectangular or square cross-section. This section would be less than the surface area of the pattern at the level at which they open up.

These ducts 13 delimit a throttling area 16 between a pattern 12 and the reservoir area 14. Therefore, the ducts 13 form an area of mechanical weakness for the material 11 to be moulded, which during mould removal means that the material 11 to be moulded will break at a duct 13. The break point will depend on the shape of the duct.

With a duct 13 with an approximately constant section, the break point will be located within the duct.

Figure 5B:
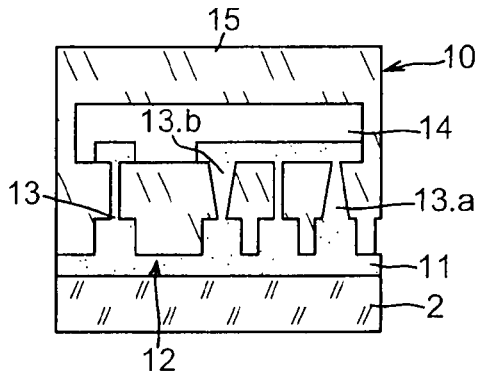

However, more complicated duct shapes can be used as shown in FIG. 5B. Two of the ducts 13.*a*, 13.*b* have a tapered shape. The others have an approximately constant section. The smallest section of the duct is located either at the pattern or at the reservoir area 14. The two variants are shown in FIG. 5B. The duct flared from the pattern to the reservoir area is marked with reference 13.*a*, and the duct flared from the reservoir area to the pattern is marked with reference 13.*b*. In this case, the break area of the material to be moulded is located at the smallest section of the duct. Preferred break areas are marked by the tips of the arrows.

Figure 5C:
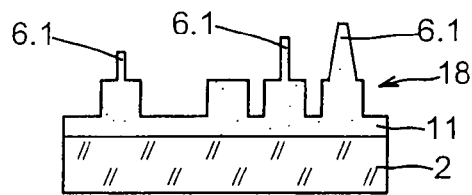

FIG. 5C shows the impression 18 of the mould 10 obtained in the material 11 to be moulded after removal of the mould shown in FIG. 5B. Three ducts contribute to forming patterns in the material 11 to be moulded. These patterns are spacers reference 6.1.

The constraints that arise when such a mould 10 is made are that the reservoir part 14 has to be made first and that one or several ducts, each having a cross-section smaller than the cross-section of the pattern in which they open up, are made afterwards.

If it is required to use this mould to print a mask in order to make a grid with a width of about 50 nanometers, the width of the duct could be about 10 nanometers.

The capacity of the reservoir area 14 will be adjusted as a function of the volume of the patterns 12 of the mould and the density of the material 11 to be moulded. Steps will be taken to assure that the capacity is greater than the material 11 to be moulded displaced during pressing. When the reservoir area 14 is supplied by several ducts as in FIG. 5C, its width can be as high as several micrometers, or even several tens of micrometers. For example, its height may be between a few nanometers and a few tens of the nanometers.

It will be possible for the reservoir area to contain a plurality of reservoirs instead of one large reservoir, to maintain good mechanical stiffness of the mould 10 during pressing. These reservoirs may be independent, but it is preferable if they are connected together to increase the total available volume for the material to be evacuated (moulding material or gas). In FIGS. 6A, 6B, the left reservoir reference 14.3 is independent, the right reservoirs reference 14.1 communicate between each other through a duct 16.

Figure 5D:
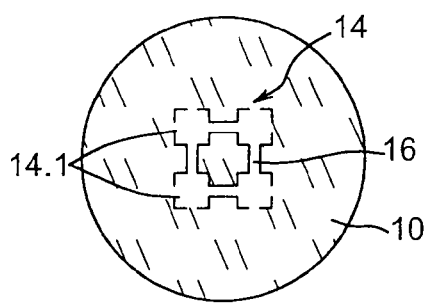

FIG. 5D shows a top view of a reservoir area 14 comprising several small reservoirs 14.1 and at least one connection duct 16 connecting the reservoirs 14.1 to each other.

It will be useful to arrange the reservoirs 14.1, 14.3 adjacent to areas in which the patterns 12 of the mould 10 are densest, since these are the areas in which penetration of the mould 10 into the material 11 to be moulded is the most difficult. Therefore the number of reservoirs 14.1 and their position depend on the geometry of the patterns 12 of the mould 10.

Refer to FIGS. 6A, 6B. These figures show a cross-section through a mould 10 according to the invention and a top view of the mould 10 when its bottom 15 has been removed.

When the reservoir area 14 is in the form of a closed cavity, it is also possible to provide it with at least one opening 17 towards the outside, in addition to the duct that opens up at the patterns, regardless of whether there is one or several reservoirs. This opening 17 acts as a vent during moulding, and is also used for evacuation and dissolution of the material 11 to be moulded that was collected in the reservoir area 14 after removing the mould. This opening 17 will also be used during manufacturing of the mould 10 to facilitate evacuation of material that was used to model the inside of the reservoir area 14, as will be seen later. This opening may be in the form of a duct 17. It may extend in a plane approximately perpendicular to the direction of the ducts 13. This duct 17 opens up at the periphery of the mould 10.

Figure 7A:
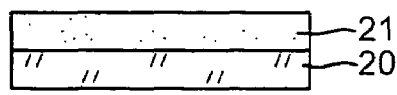
FIGS. 7A to 7O show steps in a first embodiment of a mould according to the invention.
Figure 7B:
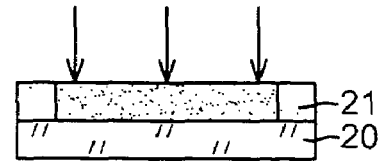
Figure 7C:
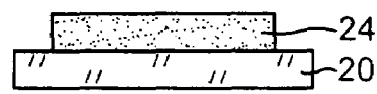
Figure 7D:
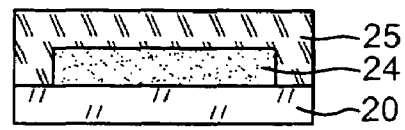
Figure 7E:
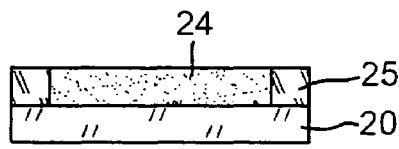
Figure 7F:
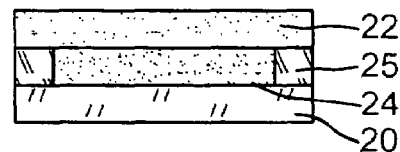
Figure 7G:
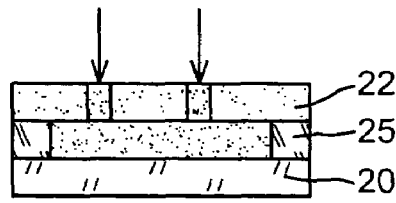
Figure 7H:
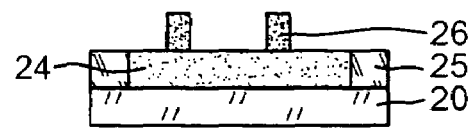
Figure 7I:
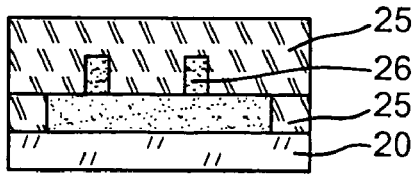
Figure 7J:
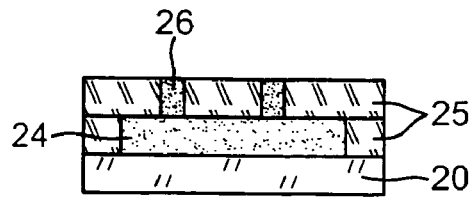
Figure 7K:
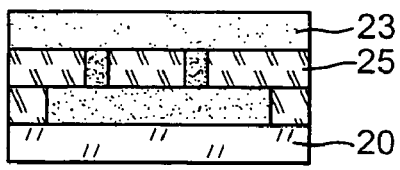
Figure 7L:
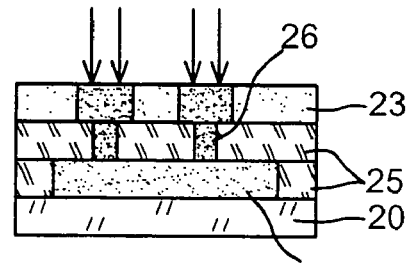
Figure 7M:
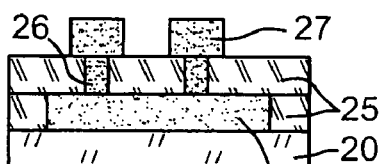
Figure 7N:
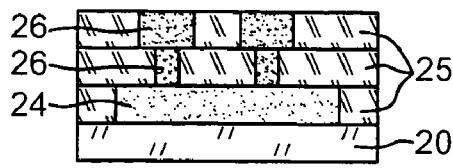
Figure 7O:
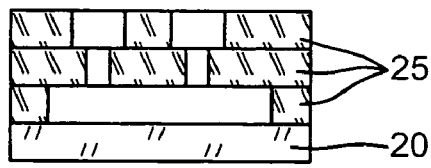

We will now describe a first example of a process for making a mould according to the invention with reference to FIGS. 7A to 7O. This process uses conventional lithography techniques.

The first step is to make the reservoir area of the mould: this may be a single reservoir or elementary reservoirs, possibly with communication ducts between the elementary reservoirs and access ducts to the outside.

A first layer of a sensitive material 21 is deposited on a substrate 20 (FIG. 7A). This deposition may be made using a conventional lithography technique, for example using a whirler. The substrate 20 will be used as a lid for the reservoir area and therefore as a bottom for the mould. By exposing the sensitive material 21 to appropriate print means, it will be possible to print a pattern corresponding to the contour of the inside of the reservoir area on it. The printing means may consist of a photonic beam (for example in the ultraviolet) and/or an electron or atom particle beam (FIG. 7B). If there are several elementary reservoirs and/or one or several connection ducts between the reservoirs and/or one or several ducts leading to the outside, the contour of the inside of these ducts will be taken into account.

The sensitive material 21 is then developed so as to form a first core 24 in the same shape as the inside of the reservoir area (FIG. 7C). Development is done using an appropriate developer that depends on the nature of the sensitive material.

The next step is to encapsulate the first core 24 with a second material 25 that is the material of the mould (FIG. 7D). This is followed by a levelling step stopping on the first core 24 so as to obtain a first surface (FIG. 7E).

A second layer 22 of a sensitive material, that may be the same as before or it may be different, is deposited on the first surface as shown in FIG. 7F, to make one or several ducts to connect the reservoir area to the mould patterns (made later). It is exposed according to a pattern corresponding to the contour of the inside of the ducts (FIG. 7G). The sensitive material 22 is developed so as to obtain one or several second cores 26, each in the shape of the inside of a duct (FIG. 7H). The second cores 26 thus obtained are encapsulated with the mould material 25 (FIG. 7I). The next step is a step to level the material from which the mould 25 is made, stopping on the second cores 26 so as to obtain a second surface (FIG. 7J).

A third layer 23 of a sensitive material is deposited on the second surface to make the mould patterns (FIG. 7K). This third layer 23 is exposed according to a pattern corresponding to the contour of the mould patterns (FIG. 7L). The sensitive material 23 is developed so as to obtain one or several third cores 27 in the shape of the pattern in the mould (FIG. 7M). The third cores 27 thus obtained are encapsulated with the mould material that is levelled stopping on the third cores 27 so as to obtain a third surface (FIG. 7N). All that is necessary then is to eliminate the sensitive material in the cores 24, 26, 27 to expose the reservoir area, the ducts and the recesses of the patterns.

Encapsulation may be done using standard physical vapour phase (PVD) deposition (sputtering, evaporation, etc.) or chemical vapour phase deposition (CVD) techniques.

Levelling is done using standard microelectronics means, for example such as mechanical and/or chemical polishing.

The sensitive material is eliminated by dissolution using an appropriate liquid or gaseous solution (for example solvent or acid) or by a plasma treatment.

The sensitive material must have sufficient selectivity with regard to the material from which the mould is made, so that it can eliminated without affecting the integrity of the mould.

The substrate 20 can advantageously be a semiconducting material, for example based on silicon, germanium, gallium arsenide or a metal, for example based on tungsten or chromium.

The sensitive material must have a sufficient resolution power such that dimensions measured in nanometers can be obtained during exposure.

Finally, the sensitive material must be technologically compatible with the material from which the mould that will encapsulate it is made. The material from which the mould is made must have the required properties for nano-printing and for mechanical strength.

Other materials could be used, for example such as PMMA (polymethyl methacrylate), calixarene, by modifying the process for making the mould to make it compatible with these resins, using methods known to those skilled in the art.

Another sensitive material that is quite suitable is a material in the hydrogen silsesquioxanes (HSQ) family that consists of siloxane based polymers in which silicon atoms are attached directly to oxygen and hydrogen atoms.

The material from which the mould 25 is made may be a semiconductor for example such as polysilicon or germanium, or a metal for example such as tungsten, chromium or nickel. The substrate 20 and the mould 25 are preferably made from the same material. Obviously this is not an obligation, the substrate only acting as a bottom for the mould and a cover for the reservoir area.

We will now describe a variant for the process described above with reference to FIGS. 8a to 8D, this variant being specific to the use of HSQ as the sensitive material. Sequencing of the steps that will be described in 8A to 8D replaces the sequence of steps described in FIGS. 7A to 7C in the previous example. The procedure is similar for the sequence of steps in FIGS. 7F to 7H and 7K to 7M.

Figure 8A:
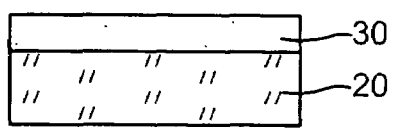
FIGS. 8A to 8D partially show a first variant of the process shown in FIG. 7.
Figure 8B:
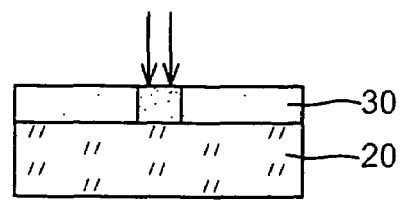
Figure 8C:
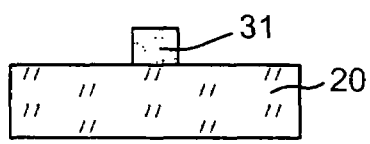

The substrate 20 is covered by a layer 30 of HSQ (FIG. 8A). This deposition is conventionally made for example using the whirler. The next step (FIG. 8B) is exposure of the HSQ layer following the contour of the inside of the reservoir area, the inside of one or several ducts or patterns in the mould. This exposure is done using an electron beam. The next step (FIG. 8C) is an HSQ development step that obtains at least one core 31 in the same shape as the inside of the reservoir area, or the shape of the inside of a duct, or the shape of the inside of a recess in the mould. The development may for example be made in a basic aqueous solution.

Figure 8D:
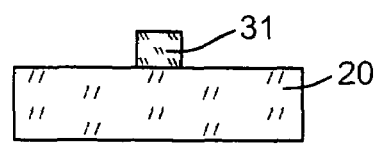

FIG. 8D is a hard bake step that compacts and/or hardens the core 31. This hard bake step is made at a temperature of about 450° C. under a nitrogen flow. The HSQ densifies and is gradually transformed into a silicon oxide $SiO_2$. This modification is an intrinsic property of HSQ and does not depend on the subjacent layer on which it is deposited.

Thus, after the lithography and hard bake steps, there is an amorphous silicon oxide core. It can be encapsulated as described above in FIGS. 7D, 7I and 7M.

The silicon oxide core can be eliminated by dissolution in a bath containing hydrofluoric acid. The concentration of hydrofluoric acid will advantageously be a few percent for an immersion time of a few minutes. The bath may be at ambient temperature. A lukewarm bath could also be used (temperature a few tens of degrees above ambient temperature) and/or ultrasounds in the bath to accelerate the dissolution rate of the silicon oxide.

One advantage of HSQ is that organic residues are not kept after dissolution of silicon oxide. Consequently, the ducts and the reservoir area are completely exposed.

Infrared characterisation also very quickly demonstrates any fraud attempt; the infrared spectrum of silicon oxide obtained by growth is different from that obtained from HSQ.

This HSQ polymer can give very good resolutions with pattern sizes less than 10 nanometers and a low roughness. This good resolution is an essential parameter for obtaining ducts with sizes measured in nanometers. Furthermore, the possibility of making patterns with very low roughness provides a means of obtaining moulds with well-controlled behaviours, in term of pressure loss, for example for flow of the material to be moulded.

Figure 9:
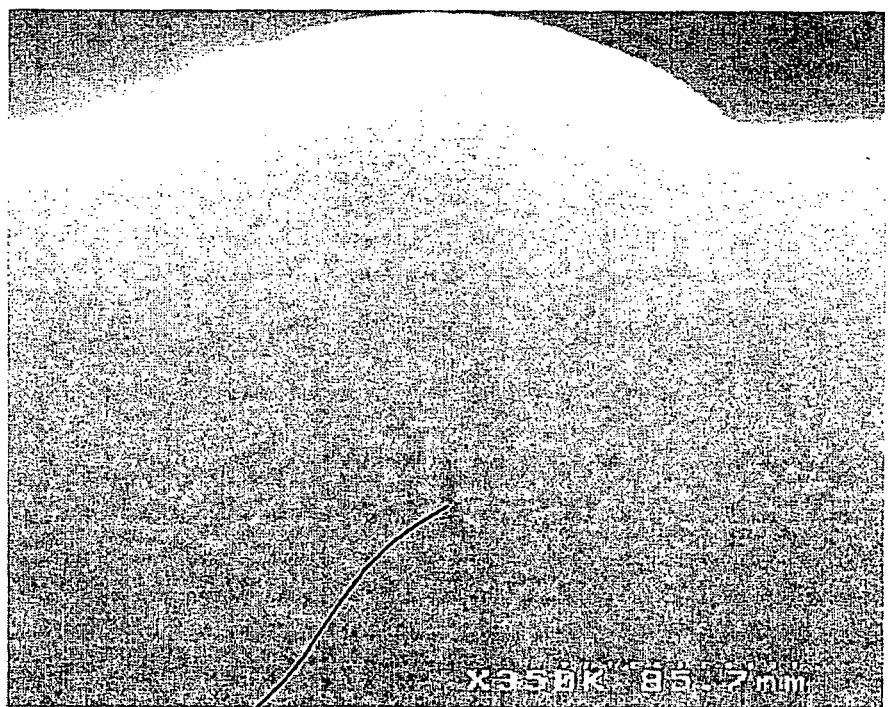
FIG. 9 shows a sectional view of a mould duct according to the invention obtained with the process shown in FIG. 8.

FIG. 9 shows a sectional view through an isolated duct 13 about 9 nanometers wide in electron microscopy obtained by the process according to the invention using HSQ. The surface of the material (for example silicon) in which the duct 13 is located can be seen in the Figure, which clearly shows that the duct 13 is embedded in the material.

Another advantage of the HSQ is that its use enables simple technological integration, since all steps are compatible with silicon clean rooms and use well-known processes.

However, it is possible to use other inorganic materials such as aluminium fluoride $AlF_3$ that may be considered as a mineral resin, as sensitive materials. For example, the article by E. Kratschmer et al, J. V. Sci Technol. B 4(1) page 361 (1986) describes that $AlF_3$ is quite compatible with making patterns with nanometric dimensions. After lithography with exposure to an electron beam, this material can be used to make aluminium cores. The development is self-generated through desorption of fluorine as explained by E. Kratschner in the article. The steps for encapsulation, levelling, and then elimination of aluminium can then be carried out in sequence to make the mould according to the invention. Aluminium in cores can be eliminated using a solution of phosphoric acid $H_3PO_4$ at 80° C.

It should be noted that this process that has just been described with these two variants does not use any etching.

Another method of making cores is shown in FIGS. 10A to 10E.

Figure 10A:
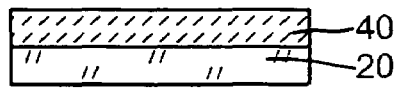
FIGS. 10A to 10E partially show another variant of the process shown in FIG. 7.
Figure 10B:
Figure 10C:
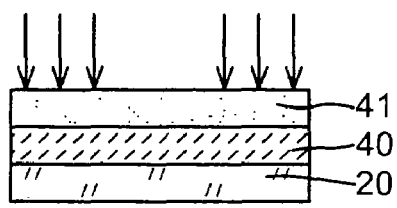
Figure 10D:
Figure 10E:
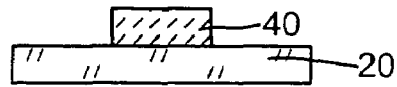

Firstly, a layer 40 of a material that will be used to make the core(s) is firstly deposited on the substrate 20 (FIG. 10A). For example, this material may be silicon oxide or aluminium. This layer is covered by a sensitive material 41 that will be exposed (FIG. 10C) and developed (FIG. 10D) so as to have a pattern 42 around the contour of each of the cores to be made. This layer of sensitive material 41 acts as a mask during an etching step of layer 40. The pattern 42 made of a sensitive material is then removed by development in an aqueous solution or by plasma treatment (FIG. 10E). The remaining part of the process consists of encapsulation, levelling and elimination of cores to obtain the same result.

Figure 11A:
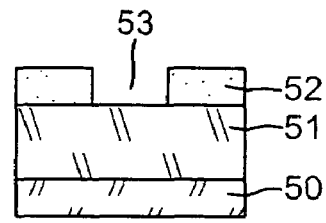
FIGS. 11A to 11G show another embodiment of the reservoir area of a mould according to the invention.
Figure 11B:
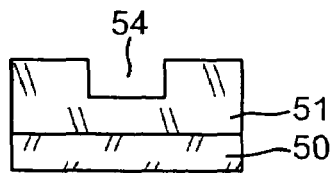

We will now explain another process for making the mould according to the invention using a transfer layer technique or molecular bonding. Refer to FIGS. 11A and 11B.

We will make the reservoir area on a first substrate 50 covered by a layer 51 of the mould material. This may be done using a conventional lithography process followed by etching. FIG. 11A shows a sensitive material 52 that has an opening 53 corresponding to the contour of the inside of the reservoir area, after lithography, on the layer 51 of the mould material.

FIG. 11B shows the layer of material from which mould 51 is made comprising a pattern 54 corresponding to the inside of the reservoir area. This pattern 54 is obtained by etching using the delimited sensitive material 52 as a mask. The sensitive material 52 was then removed. Etching may be of the wet or plasma type, for example if the mould material is silicon.

A process similar to the process described previously in FIGS. 7A to 7E can be used to make a core corresponding to the inside of the reservoir area, around the walls of the reservoir area and to eliminate the core, as in the variant shown in FIGS. 11C to 11G.

Figure 1A:
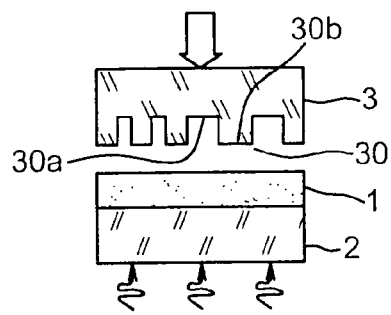
FIGS. 1A to 1D show a sequence of steps in a conventional nano-printing process.
Figure 1B:
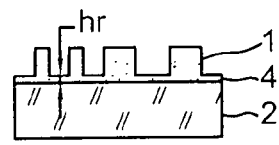
Figure 1D:
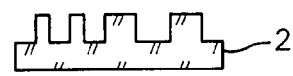
Figure 1C:
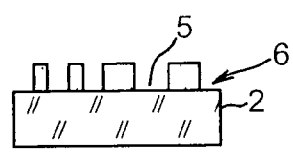
Figure 2:
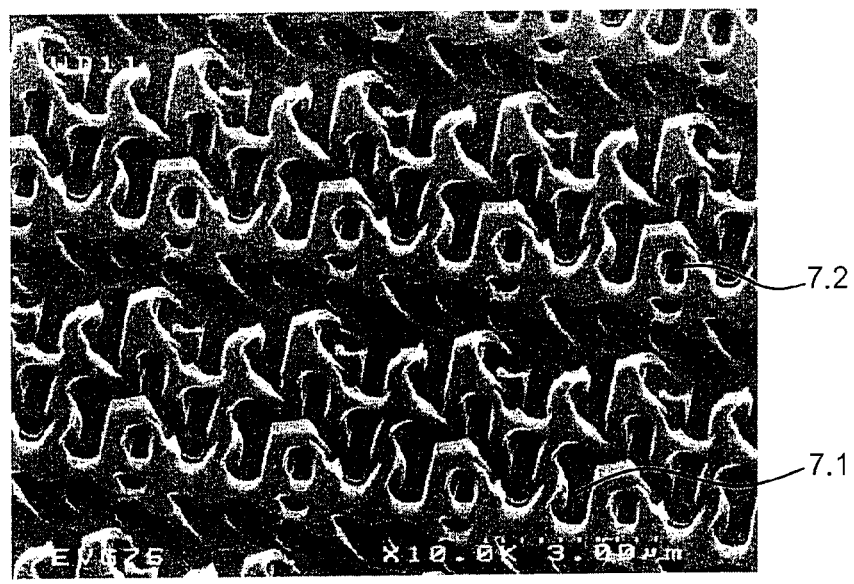
FIG. 2 shows moulding defects obtained with a mould according to prior art.
Figure 3A:
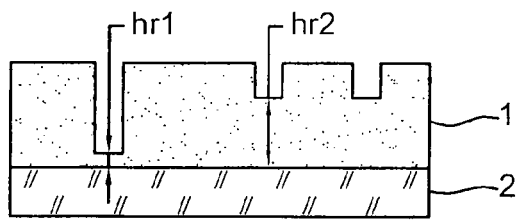
FIGS. 3A to 3C show other moulding defects obtained with a mould according to prior art.
Figure 3B:
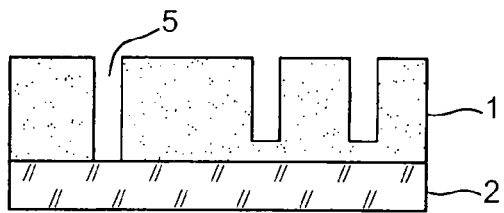
Figure 3C:
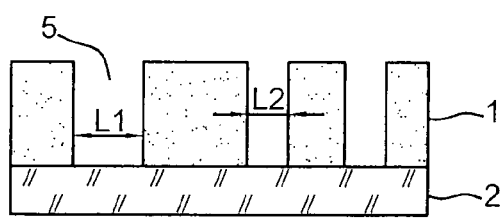
Figure 4A:
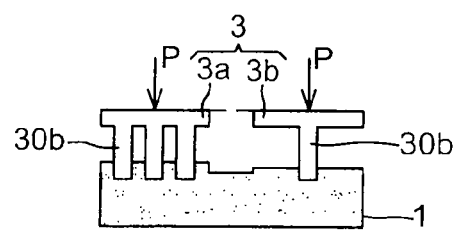
FIGS. 4A to 4D demonstrate problems encountered during use of a mould according to prior art with dense patterns.
Figure 4B:
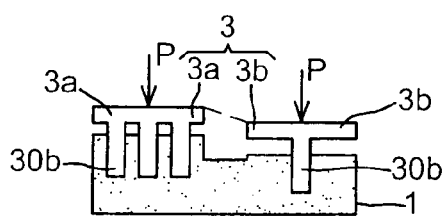
Figure 4C:
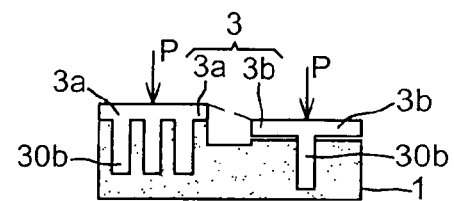
Figure 4D:
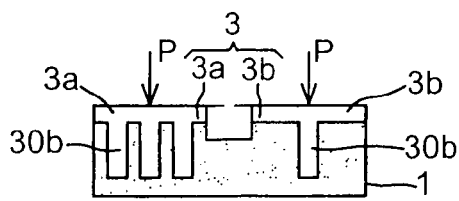
Figure 11C:
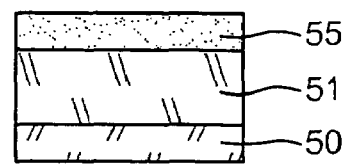
Figure 11D:
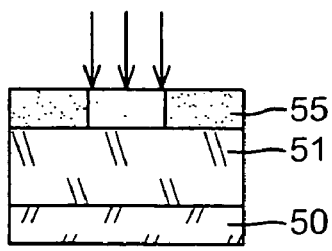
Figure 11E:
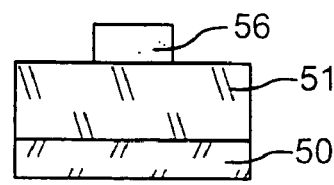
Figure 11F:
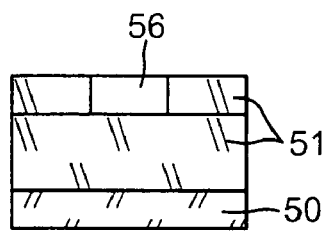

The starting point is the first substrate 50 on which a layer 51 of mould material is deposited followed by a layer of sensitive material 55 (FIG. 11C). As a variant, the layer 51 may be omitted. The sensitive material 55 is exposed according to a pattern corresponding to the contour of the inside of the reservoir area (FIG. 11D). The sensitive material 55 is developed and a first core 56 is obtained with the same shape as the inside of the reservoir area (FIG. 1E). Material for the mould 51 is deposited to encapsulate the first core 56 and the material of the mould 51 is levelled stopping on the first core 56 so as to obtain a first surface (FIG. 11F). Then all that is necessary is to eliminate the first core 56.

We will then make the mould patterns and one or several ducts using a process similar to that described above in FIGS. 7F to 7O. Refer to FIGS. 12A to 12K. The starting point is a second substrate 60, preferably a dual layer 60.1, 60.1 with the lower layer 60.1 for example made of silicon and the upper layer 60.2 for example made of silicon oxide. This second substrate 60 is a sacrificial substrate that acts as a handle and a support for the mould patterns, and it will be removed at the end of the process. The presence of two layers facilitates subsequent separation.

Figure 12A:
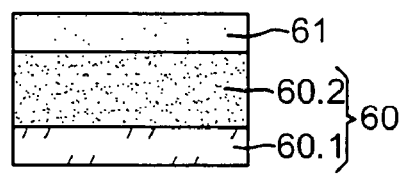
Figure 12B:
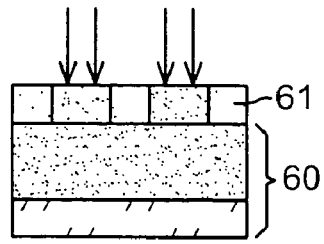
Figure 12C:
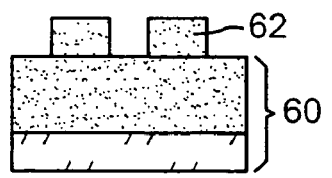
Figure 12D:
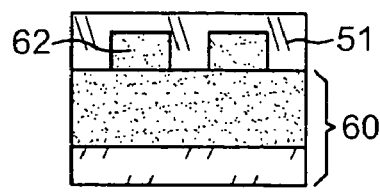

A layer of sensitive material 61 is deposited on the dual layer substrate 60 (FIG. 12A). This sensitive material 61 is exposed according to a pattern corresponding to the contour of patterns on the mould (FIG. 12B). The sensitive material 61 is developed so as to obtain one or several third cores 62 shaped like the recesses of patterns in the mould (FIG. 12C). It should be noted that the names used in the description of FIG. 7 have been reused. The second core will be made later. The third cores 62 thus obtained will be encapsulated with the material of the mould 51 that is levelled stopping on the third cores 62 so as to obtain a third surface (FIG. 12E).

A second layer 63 of a sensitive material is deposited on the third surface, with the same material as before or another material to make one or several ducts that will connect the reservoir area to the mould patterns (FIG. 12F). This second layer 63 is exposed according to a pattern corresponding to the contour of the inside of the ducts (FIG. 7G). The sensitive material 63 is developed to obtain one or several second cores 64, each with the same shape as the inside of a duct (FIG. 12H). The second cores 64 thus obtained are encapsulated with the material 51 of the mould (FIG. 12I). The next step is to level the material from which the mould 25 is made, stopping on the second cores 64 so as to obtain a second surface (FIG. 12J). The third cores 62 and the second cores 64 are then eliminated to expose the ducts and the recesses of the mould patterns (FIG. 12K).

Figure 11G:
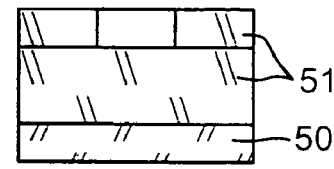

The structure obtained in FIG. 12K is then assembled to the structure obtained in FIG. 11G taking care that the ducts open up in the reservoir area (in other words the first surface to the second surface). This assembly may be made by molecular bonding or by any other layer transfer technique.

Figure 13A:
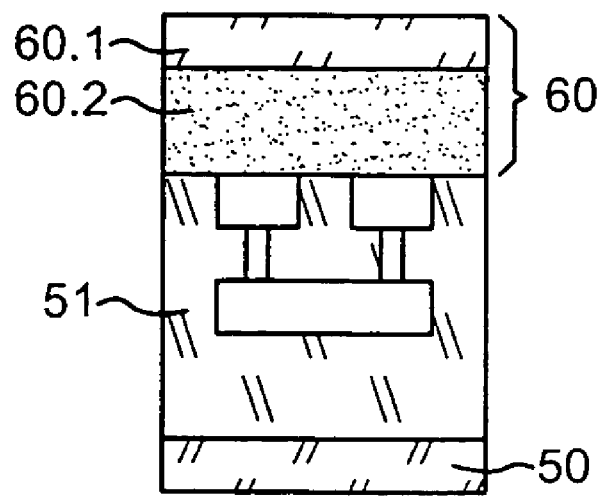
FIGS. 13A, 13B show assembly of the structure in FIG. 11G to the structure in FIG. 12K leading to a mould according to the invention being obtained.
Figure 13B:
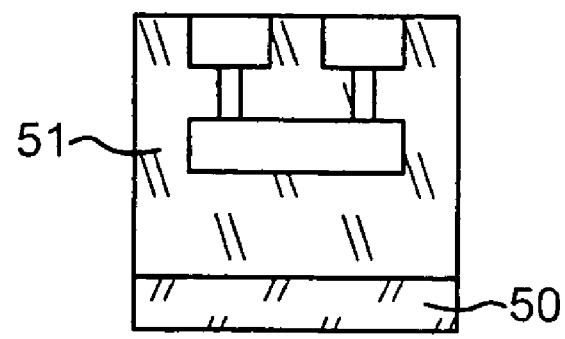

The second substrate 60 then has to be removed to access mould patterns (FIG. 13B). The layer 60.2 is sandwiched between the mould and the layer 60.1 of the substrate 60. The separation may for example be done by selective wet etching of the material making up layer 60.2, this etching being inefficient on the mould material.

As a variant, mechanical attack would be possible such as polishing of the two layers 60.1, 60.2 of the substrate 60. Mechanical attack is suitable if the substrate 60 is solid.

The fact that the reservoir area is manufactured separately from the ducts and the patterns makes it easier to expose the inside of these elements. Furthermore, standard microelectronic processes can be used.

It should be understood that these various possibilities (variants) are not exclusive of each other.

Although several embodiments of this invention have been shown and described in detail, it will be understood that various changes and modifications could be made without going outside the scope of the invention.

In particularly, instead of making the second and third cores as has just been described, in other words in a manner similar to that described in FIG. 7, it would be possible to use HSQ or a mineral resin such as aluminium fluoride as the sensitive material, and to include a hard bake step.

In this variant in which the mould is made in two parts that are subsequently assembled, it would also be possible to make the first, second and third cores by etching through a mask made by lithography as described in FIG. 10, instead of using the sensitive material as a core.

The invention claimed is:

1. A mould for nano-printing, comprising recess and projection type patterns, said mould comprising:
   one or several ducts, each providing a communication between a mould pattern and a reservoir area,
   wherein a duct has a cross-section that is smaller than a surface area of a pattern at which the duct opens up.

2. A mould for nano-printing according to claim 1, wherein the duct opens up in a recess.

3. A mould for nano-printing according to claim 1, wherein the reservoir area comprises a single reservoir.

4. A mould for nano-printing according to claim 1, wherein the reservoir area comprises a plurality of reservoirs.

5. A mould for nano-printing according to claim 4, wherein the reservoirs are independent.

6. A mould for nano-printing according to claim 4, wherein the reservoirs communicate with each other.

7. A mould for nano-printing according to claim 1, wherein the duct has an approximately constant cross-section.

8. A mould for nano-printing according to claim 1, wherein the duct has a variable cross-section.

9. A mould for nano-printing according to claim 8, wherein the duct is approximately tapered.

10. A mould for nano-printing according to claim 1, wherein the reservoir area communicates with the outside of the mould.

11. A mould for nano-printing according to claim 10, wherein at least one duct opens up at the periphery of the mould.

12. A process for manufacturing a mould according to claim 1, said process comprising several steps using lithography techniques, said steps including a step of making mould patterns, a step of making a reservoir area, a step of making at least one duct providing a communication between the reservoir area and a pattern in the mould, said steps of making using cores.

13. A process according to claim 12, wherein the step of making the reservoir area is performed by:
lithography to make a first core corresponding to the inside of the reservoir area;
encapsulating the first core in a material that is the same as the mould material;
levelling the material from which the mould is made, stopping on the first core so as to obtain a first surface;
eliminating the first core to expose the inside of the reservoir area.

14. A process for manufacturing a mould according to claim 12, wherein the step of making at least one duct is performed by:
lithography to make a core corresponding to the inside of the duct;
encapsulating the core corresponding to the inside of the duct in a material that is the same as the mould material;
levelling the mould material stopping on the core corresponding to the inside of the duct so as to obtain a surface;
eliminating the core corresponding to the inside of the duct to expose the inside of the duct.

15. A process according to claim 12, wherein the pattern production step is performed by:
lithography to make at least one core corresponding to a recess in the patterns;
encapsulating the core corresponding to a recess in the patterns in a material that is the same as the mould material;
levelling the mould material stopping on the core corresponding to a recess in the patterns so as to obtain a surface;
eliminating the core corresponding to a recess in the patterns to expose the recess.

16. A process according to claim 13, wherein the first core is made on a substrate acting as the bottom of the mould.

17. A process according to claim 13, wherein the core corresponding to the inside of the duct is made on the first surface.

18. A process according to claim 14, wherein the core corresponding to a recess in the patterns is made on the surface after levelling and stopping on the core corresponding to the inside of the duct.

19. A process according to claim 13, wherein the step of eliminating is common for the first core, the core corresponding to the inside of the duct, and the core corresponding to a recess in the patterns.

20. A process according to claim 15, wherein the core corresponding to a recess in the patterns is made on a substrate.

21. A process according to claim 20, wherein the substrate is a dual layer.

22. A process according to claim 14, wherein the core corresponding to the inside of the duct is made on the surface obtained after levelling and stopping on the core corresponding to a recess in the patterns.

23. A process according to claim 22, wherein the step of eliminating is common for the core corresponding to the inside of the duct ,and the core corresponding to a recess in the patterns.

24. A process according to claim 13, wherein the surface obtained after levelling and stopping on the core corresponding to the inside of the duct, is assembled to the first surface after the elimination step.

25. A process according to claim 24, wherein the substrate on which the core corresponding to a recess in the patterns is made, is removed after assembly.

26. A process according to claim 12, wherein cores are made of a material that has been etched through a mask obtained by lithography.

27. A process according to claim 12, wherein cores are made based on a sensitive exposed and developed material.

28. A process according to claim 27, wherein it includes a hard bake step between development and encapsulation in order to transform the sensitive material.

29. A process according to claim 27, wherein the sensitive material is a photosensitive resin or an electron sensitive resin.

30. A process according to claim 27, wherein the sensitive material is a material in the hydrogen silsesquioxanes family.

31. A process according to claim 27, wherein the sensitive material is a mineral resin such as aluminium fluoride.

32. A process for moulding a material wherein the process comprises a step of pressing a mould according to claim 1 on to the material.

* * * * *